United States Patent

Kateman et al.

[11] Patent Number: 5,727,713
[45] Date of Patent: Mar. 17, 1998

[54] CLOSED DISPENSER PRODUCT SUPPLY UNIT

[75] Inventors: Paul Kateman, Cambridge; Matthew K. Haggerty, Milton; Jonathan B. Kateman, Newton; Clifford S. Lansil, Woburn; Christopher T. Zirps, Milton, all of Mass.

[73] Assignee: Kateman Family Limited Partnership, Cambridge, Mass.

[21] Appl. No.: 577,836

[22] Filed: Dec. 22, 1995

Related U.S. Application Data

[60] Continuation-in-part of Ser. No. 308,665, Sep. 19, 1994, Pat. No. 5,603,257, which is a division of Ser. No. 154,747, Nov. 18, 1993, Pat. No. 5,433,967, which is a continuation-in-part of Ser. No. 740,725, Aug. 6, 1991, Pat. No. 5,292,030, which is a continuation-in-part of Ser. No. 564,219, Aug. 6, 1990, abandoned.

[51] Int. Cl.$^6$ ............................................. B67D 5/60
[52] U.S. Cl. .................. 222/145.6; 222/195; 222/386.5; 222/399
[58] Field of Search ......................... 222/61, 145.5, 222/145.6, 146.6, 195, 386.5, 399

[56] References Cited

U.S. PATENT DOCUMENTS 5,163,584  11/1992  Huber et al. .................. 222/195 X
5,265,764  11/1993  Rowe et al. ................... 222/146.6 X
5,405,054  4/1995   Thomas ........................ 222/146.6 X
5,526,957  6/1996   Brown et al. .................. 222/145.5 X
5,570,822  11/1996  LeMarbe et al. ................ 222/145.6 X

FOREIGN PATENT DOCUMENTS 4108586  9/1992  Germany .................. 222/386.5

Primary Examiner—Joseph Kaufman
Attorney, Agent, or Firm—Cesari and McKenna, LLP

[57] ABSTRACT

A dispenser product supply unit includes a pressurizable container for containing a product liquid and having an opening leading into one end of a conduit. Formed integrally in the conduit is a mixing chamber at which a gas may be added to the liquid followed by an elongated turbulence tube for causing turbulent flow of the mixed fluids. The opposite end of the conduit may be coupled to a distribution manifold that can distribute the aerated liquid issuing from the turbulence tube onto a surface as a relatively thin layer. Side branches from the conduit may also be present for introducing one or more additives into the fluid flowing through the conduit. The container conduit and side branches constitute an integral disposable structure. The unit is especially suitable for producing and distributing flavored ice cream and yogurt from associated dispensing apparatus.

20 Claims, 3 Drawing Sheets

CLOSED DISPENSER PRODUCT SUPPLY UNIT

RELATED APPLICATIONS

This application is a continuation-in-part of Ser. No. 08/308,665, filed Sep. 19,1994, now U.S. Pat. No. 5,603,257 which is a division of Ser. No. 08/154,747, filed Nov. 18, 1993, now U.S. Pat. No. 5,433,967, which is a continuation in-part of Ser. No. 07/740,725, filed Aug. 06, 1991, now U.S. Pat. No. 5,292,030, which is a continuation in-part of Ser. No. 07/564,219, filed Aug. 06, 1990, now abandoned.

The present invention relates generally to the production and dispensing of aerated products. It relates especially to apparatus for dispensing a liquid and a gas which are mixed in selected proportions, with the mixture, often cooled to a solid or semi-solid state, being dispensed as needed. The invention is especially suitable for the production and dispensing of frozen confections such as ice cream and frozen yogurt. It should be understood, however, that the invention is also applicable to the dispensing of frozen and non-frozen aerated products generally.

BACKGROUND OF THE INVENTION

U.S. Pat. Nos. 5,292,030 and 5,433,967 disclose methods and apparatus for producing and dispensing an aerated product which includes a mixing chamber having a first inlet for receiving a liquid, a second inlet for receiving the gas, and an outlet. A relatively long continuous turbulence tube of relatively small cross section has one end positioned to receive the effluent from the mixing chamber outlet and it's other end spaced from that outlet so the effluent is subjected to confined turbulent mixing in the turbulence tube until the fluid product is discharged from the exit end of the tube. If that product is to be cooled, the turbulence tube leads to a cooling zone or surface which cools and at least partially freezes the fluid product issuing from that tube. The apparatus disclosed there is especially suitable for making and dispensing frozen yogurt and ice cream and allows for the service of individualized fresh product portions in a variety of flavors.

In the patented apparatus, the product supply, e.g., a container of ice cream mix, is a separate physical entity from the mixing chamber and turbulence tube that process the ice cream mix to form the finished product. This means that each fresh container of mix must be opened and connected up to the plumbing leading to the mixing chamber and turbulence tube making it difficult to maintain the dispensing apparatus in a sanitary condition. Also, different dispensers may have different plumbing configurations to route the product supply and additives therefor to the mixer and turbulence tube. Accordingly, the characteristics of the dispensed product may vary from one dispenser to another, thereby making it difficult to maintain an overall product standard.

SUMMARY OF THE INVENTION

Accordingly, the present invention aims to provide a closed dispenser product supply unit for implementing the method of producing and dispensing aerated products described in the above patents.

Another object of the invention is to provide a unit of this type which maintains the product supply under sanitary conditions until it is dispensed.

Further object of the invention is to provide a closed dispenser product supply unit which can be installed as a uniform replaceable item in different dispensing apparatus.

Another object of the invention is to provide such a supply unit which is disposed of rather than being cleaned and maintained after it is empty.

Yet another object of the invention is to provide a product supply unit of this general type which can be manufactured in quantity relatively easily and inexpensively.

A further object of the invention is to provide a closed dispenser product supply unit which can be installed quickly and easily in the associated dispensing apparatus.

Other objects will, in part, be obvious and will, in part, appear hereinafter.

The invention accordingly comprises the features of construction, combination of elements and arrangement of parts which will be exemplified in the following detailed description, and the scope of the invention will be indicated in the claims.

Briefly, our closed dispenser product supply unit comprises a pressurizable container containing a product liquid and having an opening leading into one end of a conduit. Formed integrally in the conduit is a mixing chamber at which a gas is added to the liquid followed by an elongated turbulence tube for causing turbulent flow of the mixed fluids. The opposite end of the conduit is arranged to be coupled to a distribution manifold that can distribute the aerated liquid issuing from the turbulence tube onto a surface as a relatively thin layer. Short branches from the conduit may also be present for introducing one or more liquid additives into the fluid flowing through the conduit. For example, if the product liquid is ice cream or yogurt mix, the fluid additives may be different liquid flavorings.

It is a feature of the invention that the container and the conduit leading therefrom, including the mixing chamber and turbulence tube therein and any conduit branches, are formed as an integral replaceable unit whose dimensions and geometry may be fixed at the factory. The providing of the product supply unit as a single integral structure maintains sanitary conditions all the way from the product liquid container to the distribution manifold. It also maintains product uniformity from one dispensing apparatus to the next. In other words, the quality and characteristics of the dispensed product are determined by the product supply unit, not by the particular dispensing apparatus in which the unit is installed.

The subject unit can be molded of inexpensive food grade plastic material such as polyethalene, polypropylene or the like. Therefore, it is relatively easy and inexpensive to make in quantity. Furthermore, it can be installed easily into dispensing apparatus which operates as described in the above patents, the contents of which are hereby incorporated herein by reference.

BRIEF DESCRIPTION OF THE DRAWINGS

For a fuller understanding of the nature and objects of the invention, reference should be had to the following detailed description taken in connection with the accompanying drawings, in which.

DESCRIPTION OF THE PREFERRED EMBODIMENTS

Figure 1:
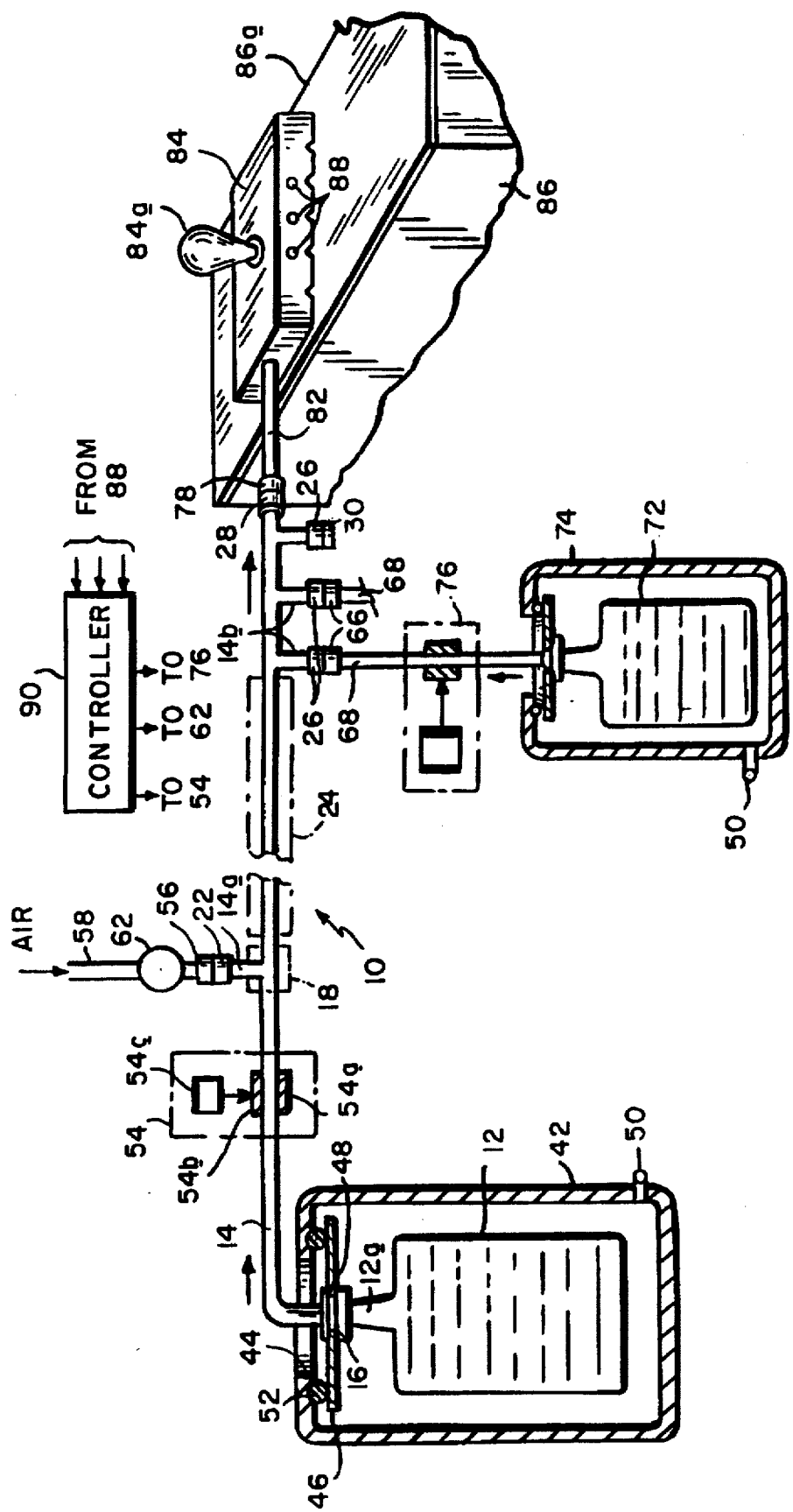
FIG. 1 is a diagrammatic view of our closed dispenser product supply unit installed in dispensing apparatus for controlling the unit.

Referring to FIG. 1 of the drawings, a first embodiment of our closed dispenser product supply unit is shown generally at 10. It comprises a container 12 such as a bag or pouch which may be filled with a liquid such as ice cream or yogurt mix. Container 12 has a necked-down outlet 12a which leads to one end of a flexible conduit 14. A flexible seal in the form of a grommet 16 encircles outlet 12a for reasons that will become apparent.

Conduit 14 includes a mixing chamber 18, i.e., a T-section having a short branch 118 conduit 14a, terminated by a coupling 22 which may be, for example, a barb, luer or bayonnet-type coupling. Located in conduit 14 downstream from mixing chamber 18 is a so-called turbulence tube or turbulator 24. Tube 24 may be simply a segment of conduit 14 having a pre-selected internal diameter and length to achieve turbulent mixing of the fluids flowing through it as described in the above patents.

In the illustrated supply unit 10, conduit 14 also includes one or more side branches 14b terminated by couplings 26 similar to coupling 22. These may be used to introduce additives into the liquid from container 12. Usually, but not necessarily, the conduit branches 14b are located downstream from the turbulence tube 24 so as to minimize the amount of additive resident in conduit 14. This minimizes additive carry-over from one dispensing cycle to the next.

The end of conduit 14 remote from container 12 constitutes the outlet of the product supply unit 10 as a whole and that end is terminated by a coupling 28 which may also be similar to coupling 22.

All of the above described pads of the product supply unit 10 may be molded at the same time as a unit so that the geometry and dimensions of all of those parts are fixed and thus uniform from unit to unit. The unit's container 12 can then be filled with a liquid such as ice cream mix, with all of the unit's couplings 22, 26 and 28 being dosed by suitable caps or plugs 30, one of which is shown in FIG. 1, closing a conduit branch coupling 26. The unit 10 thus constitutes a completely closed system which can be placed in a protective box and stored and transported, under refrigerated conditions if necessary, so that there is little likelihood that the contents of unit 10 will become contaminated or degraded.

In order to use the product supply unit 10, the unit's container 12 may be placed in a pressure vessel 42 having a relatively large opening 44 in its top wall. This opening may be closed by a cover 46. For this, the cover 46 is provided with a central opening 48 for snugly receiving the grommet 16 around the container outlet and a radial slit with overlapping sealing edges to enable the cover to be engaged around the grommet before container 12 is inserted into the pressure vessel. When the cover is in place as shown in FIG. 1, the pressure vessel 42 may be filled with a gas under pressure by way of a valved inlet 50 in the vessel wall or a pipe leading to a gas source as shown in the above patents. The gas pressure forces cover 46 against an interior sealing ring 52 that encircles opening 44 so that the vessel becomes pressure tight. The gas pressure also exerts a collapsing force on the flexible container 12 which tends to force the container contents out of the container and into the conduit 14.

The flow of liquid from container 12 is controlled by a pinch valve 54 which is part of the associated dispensing apparatus that controls unit 10. Pinch valve 54 includes a stationary jaw 54a and a movable jaw 54b which can be moved toward and away from jaw 54a by an electric or pneumatic actuator 54c. Each time a fresh product supply unit 10 is installed in the associated dispensing apparatus and before the pressure vessel 42 is pressurized, the jaws 54a and 54b may be spread apart and the conduit 14 inserted between the jaws. The actuator 54c is normally in its extended position so that the two jaws pinch off conduit 14 so that no liquid can flow from container 12 through the conduit.

Also when installing unit 10, the mixing chamber coupling 22 is connected to a mating coupling 56 at the end of a pipe 58 in the associated dispensing apparatus which pipe receives a gas, usually air, under pressure from a suitable source (not shown). A controllable normally closed valve 62 is included in pipe 58 to control the flow of gas to the mixing chamber 18.

Also when installing a fresh unit 10, each branch coupling 26 may be connected to a mating coupling 66 at the end of a tube 68 which leads to a flexible container 72 containing an additive to be added to the liquid in container 12. For example, the containers 72 may contain different liquid flavorings. Each container 72 is positioned in a pressure vessel 74 which may be substantially the same as vessel 42 and function in the same way. Thus, when the containers 72 are pressurized, the liquids in the containers are forced out through the respective tubes 68 to conduit 14. The flow of liquid from each container 72 may be controlled by a pinch valve 76 which may be identical to pinch valve 54. Each pinch valve 76 normally pinches the walls of the associated tube 68 so that no liquid can flow along the associated tube.

Finally, when installing each product supply unit 10, the coupling 28 at the outlet end of conduit 14 is connected to a mating coupling 78 at the end of a tube 82 which leads to a distribution head 84 having handle 84a. When the dispensing apparatus is in operation, an operator can maneuver the head 84 over a cabinet 86 having a thermally conductive top plate 86a. The cabinet 86 contains a refrigeration unit (not shown) which may cool the plate 86a to a temperature below freezing. The structure and operation of the distribution head 84 are described in detail in the above patents.

Thus, in the arrangement illustrated in FIG. 1, the pressure vessels 42 and 74, the pinch valves 54 and 76, the gas valve 62 and the distribution head 84 are all part of a permanent dispensing machine or installation that serves and controls the product supply unit 10. When the unit is ready for use, the pressure vessels 42 and 74 are pressurized so that product liquid in container 12 is available at the inlet end of conduit 14 and liquid flavorings from containers 72 are present at the entrance ends of tubes 68.

To use the FIG. 1 apparatus, an operator may press one of the buttons 88 present on the distribution head 84. When depressed, each button closes a circuit that provides an electrical signal to a controller 90. The controller thereupon causes the pinch valve 54 and the gas valve 62 to open for selected periods of time so that product liquid from container 12 and gas flow to the mixing chamber 18 where those fluids are mixed together and forced along the turbulence tube 24. The turbulence tube functions in the manner described in the above patents so that by the time the liquid leaves tube 24, the liquid is properly aerated and, in the case of ice cream, has the proper amount of overrun.

The depression of a button 88 also opens one of the pinch valves 76 momentarily so that a dose of a selected additive is introduced into the liquid flowing along conduit 14 so that by the time that liquid leaves the conduit 14 and enters the distribution head 84, the aerated liquid and additive are thoroughly mixed together. Of course, if a mix of additives is desired, the operator may press more than one of the buttons 88 at the same time so that two or more liquids from containers 72 are added to the product liquid flowing in conduit 14. The distribution head 84 thereupon distributes a measured amount of the aerated liquid onto the refrigerated plate 86a where the flavored aerated liquid spreads out on the plate and freezes to form a thin layer of frozen product. The operator may then scrape the frozen product from the plate and deposit it in a suitable container, all as described in the above patents.

Actually, we have found that in the case of ice cream for example, by altering the time that the product liquid is resident on the cooling surface, one can control the degree of hardness (or softness) of the resultant frozen product.

When the container 12 becomes empty, the supply unit 10 may be decoupled from the associated dispensing apparatus and disposed of or recycled, following which a fresh unit 10 may be installed in the apparatus as described above.

Figure 2:
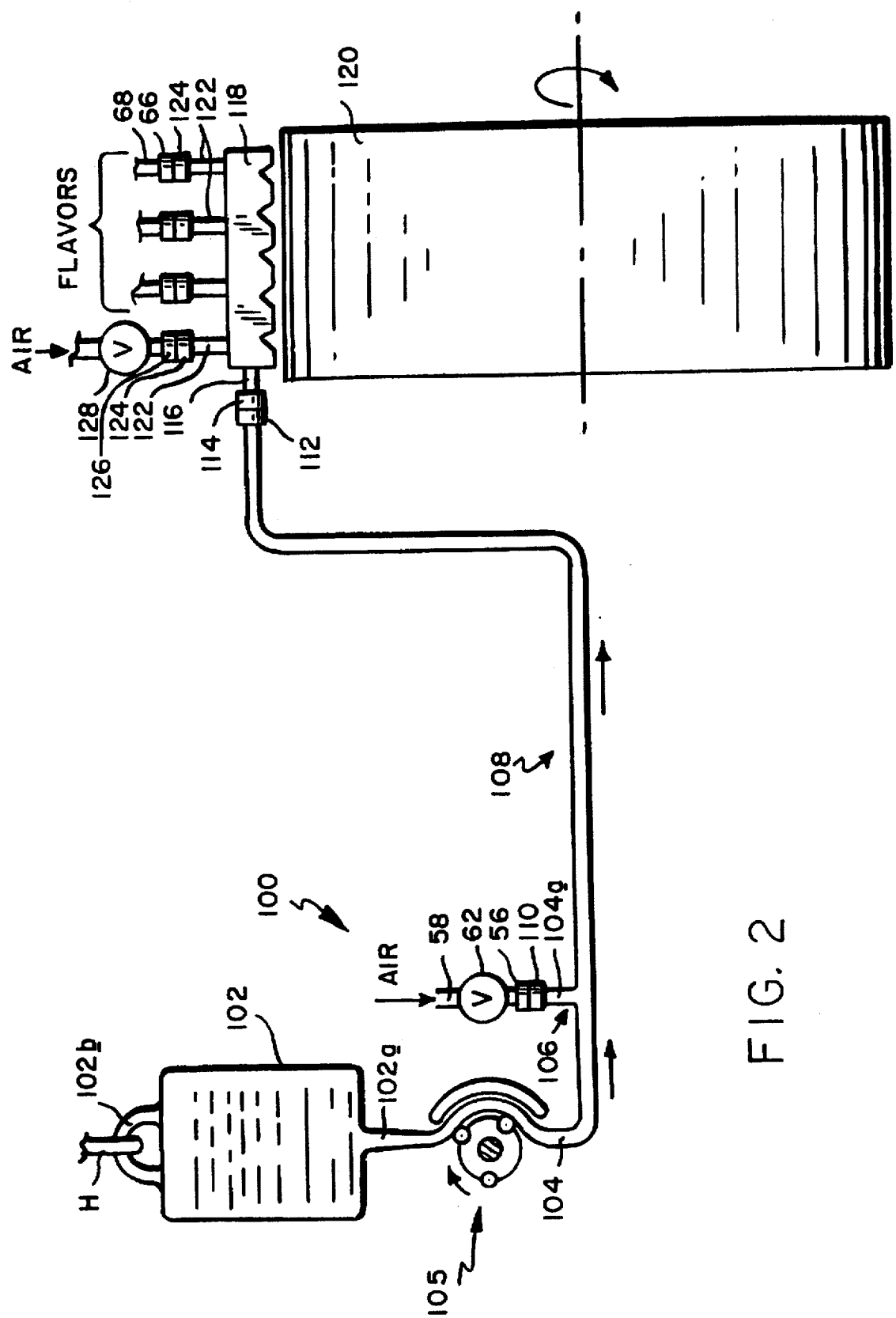
FIG. 2 is a similar view showing another embodiment of our product supply unit.

Refer now to FIG. 2 which illustrates another product supply unit embodiment shown generally at 100. This unit includes a flexible container 102 which may contain a liquid product such as yogurt mix. Container 102 has an outlet 102a which leads to a flexible conduit 104. The illustrated container 102 also has a loop 102b at the end opposite outlet 102a by which the container can be hung from a suitable hook H.

Conduit 104 passes through a conventional peristaltic pump 105 and the conduit includes a mixing chamber 106 and turbulence tube 108 located downstream from pump 105. A conduit branch 104a comprising mixing chamber 106 is terminated by a coupling 110 so that the conduit branch may be connected to a valved air supply pipe 58 similar to the one described in connection with FIG. 1. The outlet end of conduit 104 is terminated by a coupling 112 which may be mated to a coupling in 114 at the end of a tube 116. That tube leads to a distribution head 118 positioned opposite a refrigerated cylindrical surface of a rotary drum 120. The structure and operation of drum 120 is described in detail in the above patents.

Also extending into the distribution head 118 is one or more tubes 122 terminated by couplings 124 which may be connected to sources of liquid additives such as the one illustrated in FIG. 1. Thus, each coupling 124 may be connected to a mating coupling 66 at the end of a tube 68 which leads to a pressurized container 72 (FIG. 1) full of liquid additive all of which are shown in FIG. 1.

Also, extending from head 118 is a tube 122 having an end coupling 124 which may be mated to a coupling 126 at the end of a valved gas supply line having a normally closed valve 128. When valve 128 is opened, the gas flowing into head 118 will flush out any product remaining in the head.

The dispensing apparatus associated with supply unit 100 has a controller similar to controller 90 in FIG. 1 and suitably located control buttons to initiate the various product dispensing cycles. In this case, however, at the beginning of each dispensing operation, the controller opens valve 128 momentarily to purge head 118 of product before initiating fluid flow through conduit 104. This minimizes product carry-over from one dispensing cycle to the next. The controller then cycles pump 105 and opens valve 12 and a valve 76 (FIG. 1) to dispense product.

As with unit 10 in FIG. 1, the pump 105, the valve 62, the distribution head 118 and the drum 120 constitute pads of a dispensing apparatus which serves and controls the product supply unit 100. Unit 100, on the other hand, may be an inexpensive replaceable unit which may be discarded or recycled when the container 102 is empty.

Figure 3:
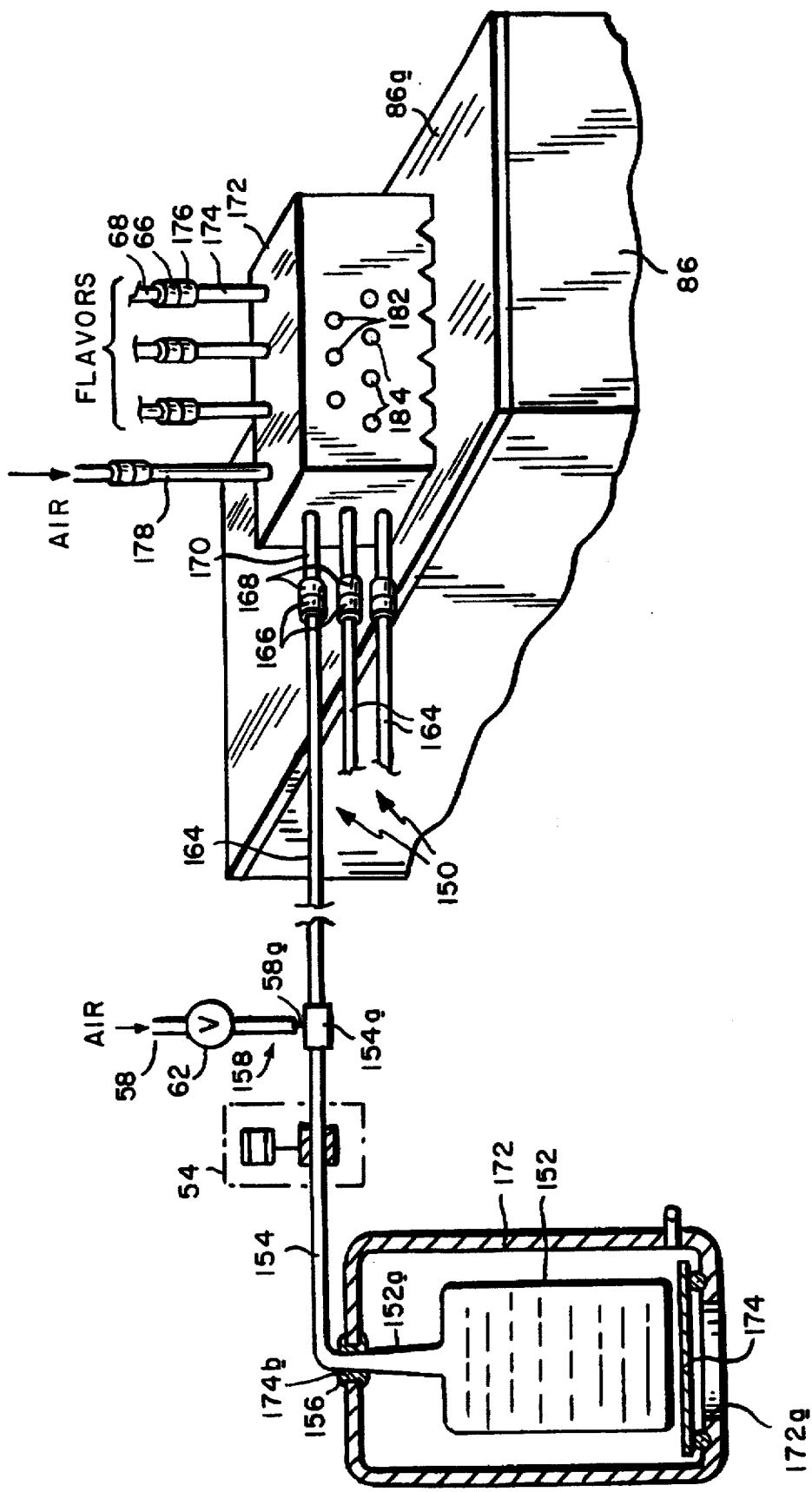
FIG. 3 illustrates a third embodiment of our product supply unit.

FIG. 3 illustrates dispensing apparatus incorporating one or more somewhat different product supply units shown generally at 150. The associated dispensing apparatus that serves unit(s) 150 is similar to the one depicted in FIG. 1, the in-common components thereof bearing the same reference numerals.

In this embodiment, the various product supply units 150 may deliver different types of product. For example, one unit may provide ice cream, another unit may deliver yogurt, a third unit may supply dietetic ice cream. Each unit 150 includes a flexible product liquid container 152 having an outlet 152a which leads to a conduit 154, there being a sealing grommet 156 surrounding the outlet 152a. Each conduit 154 passes through a pinch valve 54 and includes a mixing chamber 158. In this case, the mixing chamber is simply a segment of conduit 154 covered by a sleeve 154a of sealing material such as needle-penetrable rubber. The mixing chamber 158 is followed by a turbulence tube 164 and the outlet end of each conduit 154 carries a coupling 166.

The container 152 is pressurized in a pressure vessel 172 which is somewhat different from the vessel 42 in FIG. 1 in that it has a relatively large bottom opening 172a which may be closed by a cover 174. There is also a smaller opening 174b in the top wall of the vessel which snugly receives the grommet 156 of the associated product supply unit 150. There may be a separate pressure vessel 172 for each supply unit 150 or a single large pressure vessel that may pressurize the containers 152 of all of the supply units.

The conduit 154 of each product supply unit 150 passes through a pinch valve 54 which controls the flow of product from the associated container 152 into the corresponding conduit 154. Also, there is a separate valved pipe 58 extending to the mixing chamber 158 of each supply unit 150. In this embodiment, however, the pipe leads to a hollow needle 58a which may be inserted through sleeve 148a into conduit 154 in order to inject gas into the mixing chamber 158.

In an alternative construction, the needle 58a may be built into a clam shell arrangement which clamps around and pierces conduit 154 to form the mixing chamber at which the gas is added.

The outlet end of the conduit 154 in each product supply unit 150 is terminated by a coupling 166 arranged to be connected to a mating coupling 168 at the end of a tube 170. All of the tubes 170 lead to a single distribution manifold 172 which is otherwise similar to the head 118 described in connection with FIG. 2. Various additives may be delivered to the distribution head 172 via tubes 174 having couplings 176 that are arranged to be connected via mating couplings 66 to the tubes 68 extending to pressurized additive containers such as containers 72 shown in FIG. 2. Head 172 also receives compressed gas via a tube 178 for purging head 172 as described above in connection with FIG. 2.

Button switches 182 are provided in head 172 for controlling the valves 54 and 62 that regulate fluid flow throughout the conduit 154 of each product supply unit 150. Also, similar button switches 184 are located there for selecting among the liquid flavorings to be delivered to head 172 via tubes 174.

To use the FIG. 3 dispenser, the operator may depress one of the buttons 180 to select a particular product mix and simultaneously depress a button 182 to choose a particular additive to be introduced into the mix. The system controller 90 (FIG. 1) thereupon first opens valve 128 (FIG. 2) momentarily to purge head 172 and then opens the valves 54, 62 and 76 (FIG. 1) controlling fluid flow through the selected unit 150 and additive supply tube 174.

It should be appreciated that the features of the illustrated supply unit embodiments are interchangeable. For example, the product mix supply 102, 105 shown in FIG. 2 can be used in lieu of container 12 and valve 54 of the FIG. 1 embodiment. Also, the mixing chambers 18, 106 and 154 are interchangeable.

It will thus be seen that the objects set forth above, among those made apparent from the preceding description, are efficiently attained. Also, certain changes may be made in the above construction without departing from the scope of the invention. For example, the covers of the various pressure vessels may be formed as clam shells which engage around the product mix container outlets. Also, the containers, such as container 12, may be made of one flexible material, e.g., cardboard, and the tubing leading therefrom may be made of another material such as plastic. It is even feasible that the containers be of a rigid material with a tube leading into the container to allow the pressurization of the container interior. Therefore, it is intended that all matter contained in the above description or shown in the accompanying drawings shall be interpreted as illustrative and not in a limiting sense.

It is also to be understood that the following claims are intended to cover all of the generic and specific features of the invention described herein.

What is claimed is:

1. A sanitary dispenser unit for a food product, said unit comprising a product container for containing a food mix and having an outlet, an elongated flexible fluid conduit leading from said outlet and having a wall, said conduit including a mixing segment followed by an elongated turbulence segment having an exit end, and access means for introducing a gas into the mixing segment so that the food mix and gas undergo confined turbulent mixing in the turbulence segment, said container, conduit and access means constituting an integral unitary disposable structure.

2. The unit defined in claim 1 and further including coupling means at the exit end for coupling the conduit to a fluid distributor.

3. The unit defined in claim 2 and further including a hollow fluid distributor coupled to the conduit exit end for receiving and distributing the fluid exiting said exit end.

4. The unit defined in claim 3 and further introducing means for introducing fluid additives into said distributor for mixing with the fluid exiting said exit end.

5. The unit defined in claim 1 wherein said conduit includes introducing means in said conduit wall for introducing a plurality of fluid additives into said conduit.

6. The unit defined in claim 5 wherein said introducing means are located along the conduit between the mixing segment and the exit end.

7. The unit defined in claim 6 and further including additive containers releasably coupled to said introducing means.

8. The unit defined in claim 7 and further including means for pressurizing the interiors of said containers to force the contents thereof into said conduit.

9. The unit defined in claim 1 wherein said access means comprise a conduit side branch and means for releasably coupling said side branch to a gas source.

10. The unit defined in claim 9 and further including releasable closure means for closing said exit end and said conduit side branch.

11. The unit defined in claim 1 and further including means for pressurizing the interiors of said additive containers to force the contents thereof into said conduit.

12. A dispenser product supply unit comprising a product container having an outlet, an elongated, flexible fluid conduit leading from said outlet, said conduit including a mixing chamber followed by a turbulence tube having an exit end, and access means for introducing a gas into the mixing chamber, said access means including a needle-penetrable self-sealing wall portion of said conduit, said container, conduit and access means constituting an integral structure.

13. The unit defined in claim 12 and further including introducing means in another wall portion of said conduit for introducing a plurality of fluid additives into said conduit.

14. The unit defined in claim 13 wherein said introducing means include one or more side branches.

15. The unit defined in claim 13 wherein said introducing means include a second needle-penetrable self-sealing wall portion of said conduit.

16. A sanitary disposable plastic dispenser unit for a food product, said unit comprising a collapsible bag for containing a food mix and having an outlet, an elongated flexible tube, leading from the outlet, said tube having a wall and an exit end and being adapted to receive the mix from said bag, said tube including a mixing segment having access means for introducing a gas into the mixing segment where it may intermix with the food mix from the bag and a turbulence segment of sufficient length to produce confined turbulent mixing of the food mix from the bag and the gas before they reach the exit end of the tube.

17. The unit defined in claim 16 and further including pumping means for pumping food mix from the bag into the tube.

18. The unit defined in claim 17 wherein the pumping means comprise a peristaltic pump incorporated into the tube.

19. The unit defined in claim 17 wherein the pumping means include means for collapsing the bag.

20. The unit defined in claim 16 and further including introducing means in the tube wall for introducing a plurality of food additives into the tube.

* * * * *